Jan. 22, 1952 W. L. HUNTINGTON 2,583,178
REFRIGERATION CONTROL APPARATUS
Filed Oct. 21, 1948 2 SHEETS—SHEET 1

INVENTOR.
WILLIAM L. HUNTINGTON
BY
*George H Fisher*
ATTORNEY

Jan. 22, 1952 W. L. HUNTINGTON 2,583,178
REFRIGERATION CONTROL APPARATUS
Filed Oct. 21, 1948 2 SHEETS—SHEET 2

INVENTOR.
WILLIAM L. HUNTINGTON
BY George H Fisher
ATTORNEY

Patented Jan. 22, 1952

2,583,178

UNITED STATES PATENT OFFICE 2,583,178

REFRIGERATION CONTROL APPARATUS

William L. Huntington, Minneapolis, Minn., assignor to Minneapolis-Honeywell Regulator Company, Minneapolis, Minn., a corporation of Delaware Application October 21, 1948, Serial No. 55,705

13 Claims. (Cl. 62—8)

This invention relates to an electronically controlled expansion valve for a refrigerating system.

To obtain the maximum utility from a refrigerating system, it is essential that each of the components of the system work under the most favorable conditions possible, this being especially true of the evaporator. However, in the ordinary system using a thermostatic expansion valve, a considerable portion of the evaporator is used to superheat the refrigerant for preventing damage to the compressor. Because the heat transfer rate through the evaporator to the refrierant is much slower for the dry gaseous refrigerant than for the wet refrigerant, an unduly large part of the evaporator is used for superheating the refrigerant and thus has relatively little cooling ability. Although it is obvious that a reduction of the amount of superheat will increase the efficiency of the evaporator, it is not practical to reduce the superheat setting of a thermostatic expansion valve below about 10° principally because of the sluggish response of its thermal element.

It is therefore an object of this invention to provide a refrigerating control system and components therefor capable of practical operation with low values of superheat.

It is a further object to provide a refrigerating control system using accurate and quickly responsive temperature sensing devices for controlling the expansion valve, said sensing devices being located near the entrance and exit of the evaporator.

It is also an object to provide control apparatus for a refrigerating system incorporating an electrical network circuit having components responsive to the temperature at the entrance and exit of the evaporator, the temperature at the entrance being determined in accordance with the pressure in the exit of the evaporator.

It is an additional object to provide control apparatus for a refrigerating system incorporating an electrical network circuit for controlling the expansion valve in a manner to maintain a predetermined superheat value and wherein said circuit also includes an impedance varied manually, in response to space temperature, or the like, for determining said superheat value.

It is a further object to provide a refrigerating control system including an expansion valve controlled in response to differential temperature and having provisions for quickly establishing sufficient temperature difference to drive the valve open upon putting the system in operation.

It is an object to provide a refrigerating expansion valve including an auxiliary expansion chamber connected to the upstream side of the expansion valve by a restricted passage and having a connection for a pressure equalizer line.

It is an additional object to provide a temperature responsive resistor arranged to fit within the above described auxiliary expansion chamber and arranged to be easily sealed from both refrigerant and surrounding air.

It is also an object to provide a fitting for the downstream side of the evaporator incorporating a temperature responsive resistor similar to that used in the auxiliary chamber of the expansion valve and also having an equalizer line connection.

It is the further object to provide a positively driven refrigerating expansion valve having a bellows seal-off of minimum diameter and having a strain release mechanism encompassing a portion of the bellows seal-off.

It is also an object to provide a refrigerating expansion valve having an auxiliary expansion chamber integral therewith so that there is a slight heat exchange between the liquid portion of the valve and the auxiliary expansion chamber to thus provide a means for raising the temperature in the expansion chamber.

It is an additional object to provide temperature sensing elements for a refrigerating system having a minimum temperature lag and capable of easily being sealed against both refrigerant and the surrounding atmosphere.

It is a further object to provide a refrigerating system wherein the expansion valve is controlled by differential temperature and wherein the differential temperatures are compared on an equal pressure basis.

These and other objects will become apparent upon a study of the following specification and drawings wherein.

Figure 1:
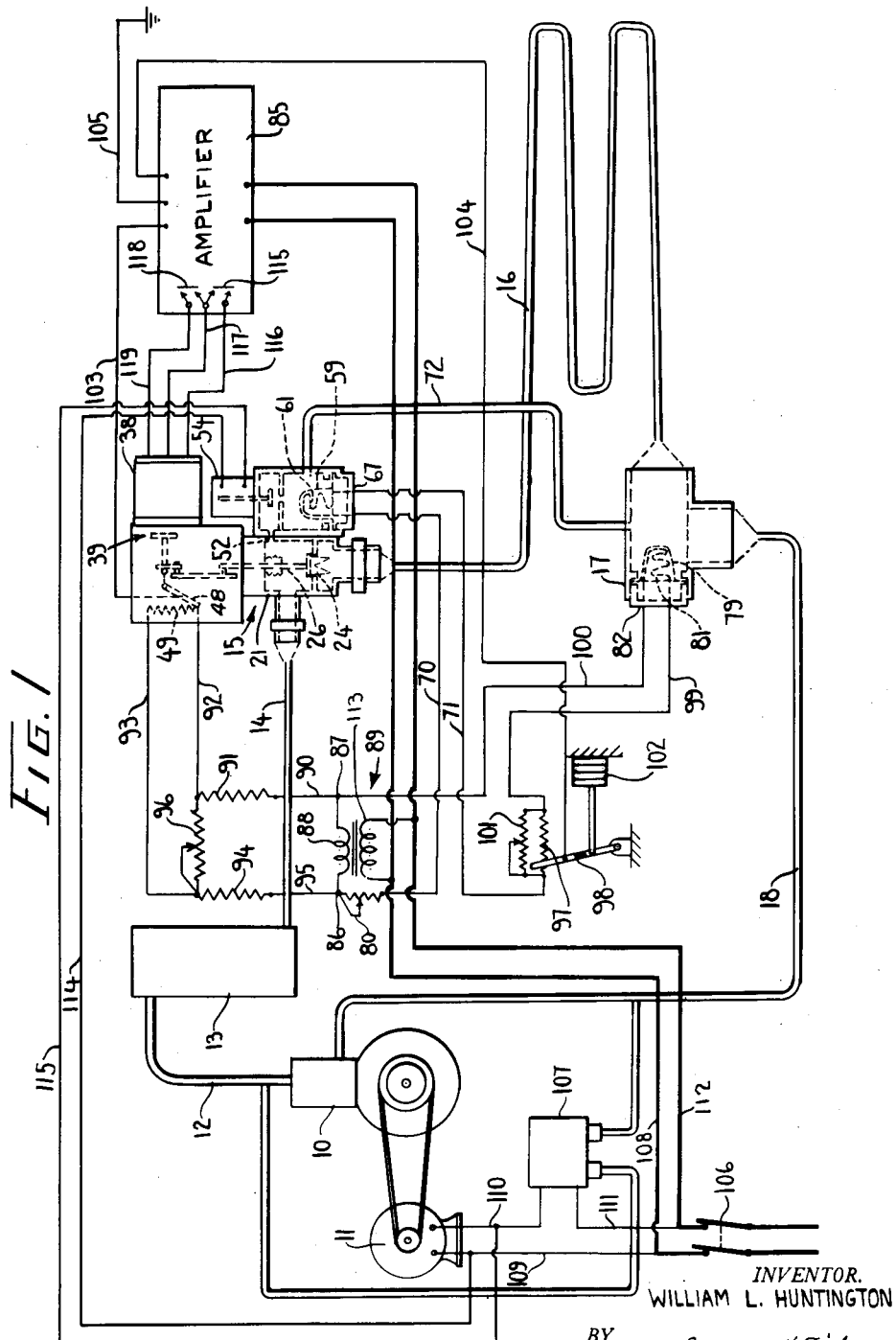
Figure 1 is a schematic representation of a refrigerating system controlled in accordance with the present invention.

In Figure 1, compressor 10 is driven by motor 11 and pumps refrigerant through pipe 12 into condenser 13. Condenser 13 is connected by liquid line 14 through expansion valve 15 to evaporator 16, and a return line fitting 17 is connected between the outlet of the evaporator 16 and the return line or suction pipe 18 which extends to the inlet of compressor 10. This refrigerating system is thus a conventional one, with the exception of the expansion valve 15, return line fitting 17, and other control apparatus.

Figure 2:
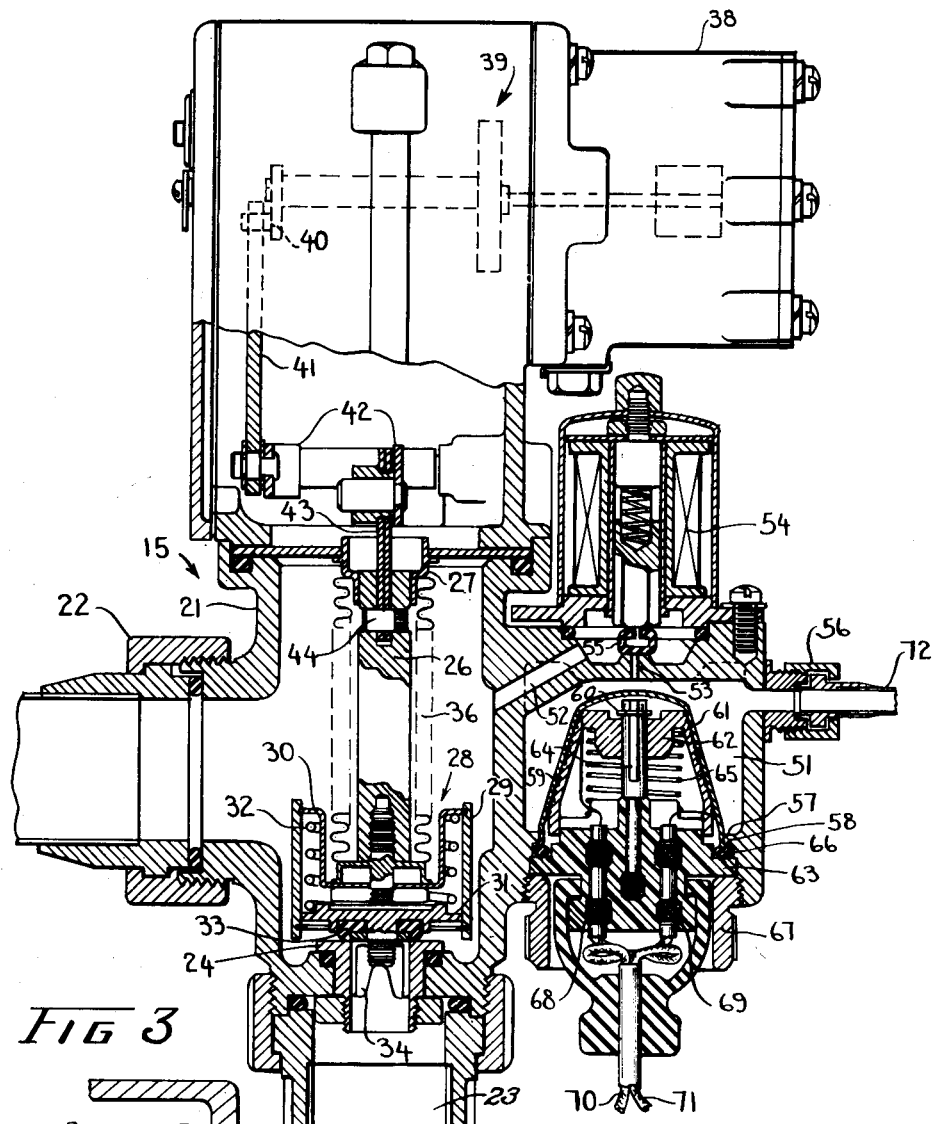
Figure 2 is an elevation view, with parts in section, of the expansion valve used in Figure 1.
Figure 3:
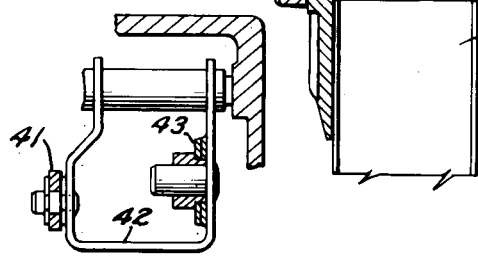
Figure 3 is a partial plan view of the connecting yoke of the operator in Figure 2, parts being in section and parts broken away.

The expansion valve 15, best shown in Figure 2, comprises a valve body 21, an inlet 22 and an outlet 23, with valve seat 24 being arranged between the inlet and outlet in the conventional manner. The vertically reciprocable valve stem 26 is slidably guided by a sleeve member 27 at its upper end and carries a strain release mechanism 28 at its lower end. The strain release mechanism comprises an outer cylindrical member 29 securely attached to an upper recessed spring retainer 30 and also includes a piston-like lower member 31 urged downwardly by spring 32, member 31 having attached to its lower side a resilient sealing disk 33 for engagement with valve seat 24 and a characterized skirt member 34 for improving the modulating characteristics of the valve. A relatively small diameter bellows seal-off 36 is connected to the lower end of valve stem 26 and to sleeve 27, this bellows seal being only large enough in diameter to accommodate the valve stem 26. By making this seal of minimum diameter, variations in refrigerant pressure have relatively little effect on the operating forces required by the valve.

Valve stem 26 is actuated by a mechanism including a conventional reversible motor 38 operating through a gear train 39, a crank arm 40, a connecting link 41, a pivoted yoke member 42 and a connecting link 43 which is attached to valve stem 26 by a pin 44. In addition to actuating the valve stem 26, a follow-up potentiometer, shown schematically in Figure 1 and not shown in Figure 2, is actuated simultaneously with the valve.

Formed integral with valve body 21 is an expansion chamber 51, this chamber connecting with the inlet side of valve 15 through a passage 52 and a restricted orifice 53, orifice 53 being controlled by a solenoid valve 54 having a valve member 55 closing said orifice 53 when in the deenergized position. Thus, when solenoid valve 54 is deenergized, no fluid can flow from valve 15 into chamber 51 but when said valve is energized, refrigerant may flow from the inlet side of valve 15 through passage 52 and orifice 53 into chamber 51. Chamber 51 is also provided with a fitting 56 for connection to an equalizer line 72, the function of which will appear as the description proceeds.

The bottom portion of chamber 51 is formed with an inwardly directed peripheral flange 57 upon which is seated an outwardly extending flange 58 of an inverted cup-like sheet metal member 59, said member 59 projecting into chamber 51. Member 59 serves to shield an impedance winding 61 formed of insulated wire having a relatively high temperature coefficient of resistance, such as nickel or Balco, and wound on the outer surface of an insulating core 62, molded nylon being a good material for this core member. Core 62 is slidably mounted on a pin 64, said pin being anchored in base member 63. A spring 65 is arranged between member 63 and core 62 to urge the core member away from the base member and toward retainer washer 60 attached to said pin. Pin 64 has a flat milled on one side coacting with a corresponding flat in the bore of core member 62 to prevent relative rotation and thus prevent damage to the connecting portions of winding 61. As assembled, with flange 58 bearing against flange 57, and a suitable gasket 66 arranged between member 63 and flange 58, member 63 is forced inwardly by a threaded retainer nut 67 which thus not only forces flange 58 tightly against flange 57 but also deforms gasket 66 sufficiently to form a second seal between flange 58 and the body of chamber 51 and further seals the space between flange 58 and member 63, hence winding 61 and core 62 are effectively sealed from refrigerant in chamber 51 and from the outside air. The ends of winding 61 are connected through embedded inserts 68 and 69 which in turn are connected to wires 70 and 71, respectively. While there is little question as to the desirability of sealing core 62 and winding 61 from the refrigerant in chamber 51, it is also highly desirable to seal this space from the surrounding atmosphere for, because this chamber is normally at a rather low temperature, condensation would take place if air could gain access to this structure. When assembled as above described, resistance winding 61 is held in good thermal contact with member 59 by spring 65 hence is quickly responsive to temperature changes in chamber 51. The thermal path to winding 61 can be further improved by smearing the outer surface of the winding with a Silicone grease, or similar material, prior to assembly, this procedure tending to eliminate voids and to increase the heat conductive area. Obviously, instead of a temperature sensing device as above described, negative temperature coefficient resistors or thermocouples may be used.

The equalizer connection previously mentioned comprises a tube 72 connected to fitting 56 at one end and connected to the return line fitting 17 at its other end. Fitting 17 is shown as a T and has a temperature responsive resistor assembly similar to that in chamber 51 inserted in one of its branches, but obviously any other form of fitting that will expose the temperature responsive resistor to the flowing refrigerant may be used. This resistor includes a metallic cup-like member 79 corresponding to 59 above described and a winding 81 corresponding to winding 61 of the above structure, with member 79 and winding 81 being retained by a nut 82 corresponding to 67, as previously described. Although not as fully described, this temperature responsive device is exactly the same as the corresponding device in chamber 51 although if desired, winding 81 may be made with a resistance value different from that of 61. As thus arranged, winding 81 responds to the temperature of the refrigerant at the outlet of evaporator 16 and the pressure in chamber 51 is the same as that at the outlet of the evaporator due to tube 72.

Motor 38 of valve 15 is controlled by an amplifier 85 which in turn is controlled by a network circuit including resistors 49, 61, and 81. Amplifier 85 may be of any conventional sort capable of operating one relay or another depending upon the phase relation of its input signal. In this particular system, an amplifier such as described in Upton Patent 2,423,534 issued July 8, 1947 has been found quite satisfactory. Obviously, the motor, gear train and follow-up arrangement of Upton may also be used instead of the like components herein shown.

The network circuit used for controlling the present system comprises input terminals 86 and 87 energized by a secondary winding 88 of transformer 89 and starting from terminal 87, the upper right hand branch of the network includes wire 90, fixed resistor 91, wire 92, and the portion of resistor 49 below wiper 48, wiper 48 constituting one of the output terminals of the network. From output terminal 48, the upper left hand branch comprises the portion of resistor 49 above wiper 48, wire 93, fixed resistor 94 and wire 96 to input terminal 86. A variable resistor 96 is connected in shunt relation to resistor 49 to vary the authority of the follow-up potentiometer comprising wiper 48 and resistor 49 this authority preferably being only sufficient to prevent "hunting." Continuing in a counterclockwise direction, the lower left hand branch of the network, from terminal 86, comprises variable resistor 80, wire 70, resistor 61, wire 71 and the portion of resistor 97 to the left of wiper 98, wiper 98 comprising the other output terminal for the network. The lower right hand branch of the network comprises the portion of resistor 97 to the right of wiper 98, wire 99, resistor 81, and wire 100 back to input terminal 87. As before mentioned, the resistance values of 61 and 81 are preferably equal (with equal temperature) and resistor 80 is used to determine the minimum superheat to be maintained by the system. A variable resistor 101 is connected in shunt relation to resistor 97 to vary the authority of this potentiometer, which is normally adjusted by a room temperature responsive thermostatic device 102, this device functioning to determine the control point for the network or, perhaps more exactly, to increase the superheat with a decrease in space temperature and to decrease the superheat as the space temperature increases. As previously suggested, a manually controlled potentiometer may be used for this function if desired. Wiper 48 is connected to amplifier 85 by a wire 103 and wiper 98 is connected to the amplifier by wire 104, common wire 105 being grounded.

The compressor 10 is controlled by a manual switch 106 and by a control device 107 for controlling the compressor in response to suction pressure and for preventing its operation in the event of excessive head pressure, device 107 preferably being of the sort described in Kronmiller Patent 2,377,503 issued June 5, 1945.

*Operation*

With the network connected as shown, the various components are given resistance values such that, with wiper 98 at its left extent, or minimum superheat position, with a predetermined temperature difference between resistor 61 and 81, such as two and one-half degrees, and with wiper 48 at the mid point of resistor 49, the network is balanced. The minimum temperature difference to be maintained between 61 and 81, as before described, depends upon the adjustment of resistor 80, and the change in superheat required to cause full movement of the valve, such as one degree, depends upon the authority given the follow-up potentiometer by the adjustment of resistor 96. The maximum superheat to be maintained, with wiper 98 at its right entrance, depends upon the authority given the space temperature controlled potentiometer by resistor 101 and may be assumed as 17 degrees, 15 degrees more than the minimum value. With these values being assumed, and with the system shut down, the network is unbalanced in a direction to close valve 15, the similar temperature of pickups 61 and 81 during shutdown having the same effect as operating with no superheat.

Now, to start the refrigerating system, switch 106 is closed, and the compressor is put in operation by the circuit: line wire 108, wire 109, motor 11, wire 110, controller 107, wire 111 and line wire 112. Simultaneously, the network circuit is energized by primary winding 113 of transformer 89 which is connected across line wires 108 and 112, as is amplifier 85. In addition, solenoid valve 54, connected in parallel with the compressor motor 11 by wires 114 and 115 connecting with wires 109 and 110, respectively, is energized simultaneously with said motors. With the apparatus energized as described and compressor 10 in operation, it is noted that valve 15 is closed and solenoid valve 54 is open. With valve 15 closed, the refrigerant cannot flow through the evaporator hence actual refrigeration has not yet started. As above described, it is apparent that the network circuit is not in balance and there is an output signal to the amplifier 85 of a sort causing it to energize relay 118 and thereby drive valve 15 closed. However, due to solenoid valve 54 now being open, refrigerant starts flowing through passage 52 and orifice 53 into chamber 51 and, because chamber 51 is at a reduced pressure, refrigeration takes place in this chamber with the temperature therein being lowered to the boiling point of the refrigerant at the suction pressure in question. The effect of this is to lower the temperature and therefore lower the resistance of resistor 61 relative to that of resistor 81, thus bringing the network to balance when this difference is two and one-half degrees and causing relay 118 to open, and unbalancing the network in the opposite direction as this temperature difference increases. This latter unbalance is similar to that caused by excessive superheat and therefore calls for opening of valve 15 by pulling in relay 115 and energizing motor 38 through wire 116 and common wire 117. As valve 15 opens refrigerant is fed into the evaporator 16 and refrigeration begins. One of the first effects of the operation of the refrigerating apparatus, from the control standpoint, is the reducing of the temperature of resistor 81 which, as it approaches the temperature and resistance of 61, tends to restore the balance of the network. Thus, when the temperature of 81 becomes less than three degrees above that of 61, valve 15 throttles toward closed position and is fully closed when the difference diminishes to two degrees, as above pointed out. Obviously, the one degree throttling range above described may be reduced to zero by adjusting resistor 96 to a zero resistance value, the system then functioning as a floating system. Also, the throttling range may be increased, if necessary for stable operation, by adjusting 96 to a higher resistance value to thus increase the effect of the follow-up potentiometer 48—49 on the network. For a fuller explanation of the control of the amplifier 85 by the network circuit, reference is made to the aforementioned Upton Patent 2,423,534.

As the refrigerating apparatus continues in operation, the room temperature is reduced and wiper 98 is adjusted to the right across resistor 97 by bellows 102, this having the effect of reducing the resistance in the leg of the network including resistor 81 and increasing the resistance in the branch having resistor 61. Under these conditions, to keep the network balanced, it is necessary that the resistance of 61 be lowered relative to 81 or, in other words, a higher degree of superheat is called for, thus tending to decrease the output of the refrigerating system. By modulating the output of the system by varying the amount of superheat, short cycling of the apparatus is prevented and good control results.

In the system described, resistor 81 has been responding to temperature of refrigerant in the outlet of evaporator 16 and resistor 61 has been responding to a temperature due to the presence of liquid refrigerant at a pressure corresponding to that at the outlet of the evaporator. Therefore, regardless of the friction in the evaporator, the difference in temperature of pick-up devices 61 and 81 gives a true measure of superheat and, because there is obtained a true measure of the superheat and because of the very rapid response of resistors 61 and 81, effective control with only a few degrees superheat is readily achieved. In fact, superheat settings as low as 2 degrees have been used and stable control has been achieved with a throttling range of ½ degree.

Should, for any reason, the apparatus be closed down, solenoid valve 54 is deenergized and closes orifice 53 to thereby stop further refrigerant passing into chamber 51 and, upon stopping the refrigerant flow, fitting 17 tends to rise to its ambient temperature as does chamber 51. Because chamber 51 is immediately adjacent valve 15 it tends to be warmed slightly by the liquid refrigerant in the upper portion of the valve, this liquid refrigerant being generally warmer than the downstream side of the valve. Because of this slight warming effect, the resistance of 61 is somewhat increased and tends to be at least as high as that of 81, thereby assuring that valve 15 stays closed until solenoid valve 54 is again energized.

Although the above description relates to the preferred embodiment of the present invention, many substitutions and equivalents will occur to those skilled in the art, hence the scope of the invention is to be determined only by the appended claims.

I claim as my invention:

1. In a refrigerating system including electrically energizable means for causing operation of said system, an expansion valve, and an evaporator; control apparatus for said system comprising; a motor for operating said valve, first electric impedance means responsive to refrigerant temperature at said valve, second electric impedance means responsive to refrigerant temperature at the outlet of said evaporator, a relay means, an electrical circuit including said first and second means and said relay means for controlling said motor, and electrically operable means controlled simultaneously with said energizable means for causing a temperature difference between said first and second means before said valve opens.

2. In a refrigerating system including electrically energizable means for causing operation of said system, an expansion valve and an evaporator; control apparatus for said system comprising; a motor for operating said valve, means responsive to the temperature of liquid refrigerant near said valve, similar means responsive to the temperature of refrigerant near the outlet of said evaporator, means including a conduit for imposing the pressure existing in the outlet portion of said evaporator on the first named temperature responsive means, an electrical circuit for connecting both of said temperature responsive means in controlling relation to said motor, and second valve means operated upon energization of said energizable means for controlling a flow of liquid refrigerant to said first named temperature responsive means.

3. In a refrigerating system including an expansion valve and an evaporator, a reversible motor for operating said valve, an expansion chamber connected to the upstream side of said valve by a restricted passage means, a device responsive to temperature in said chamber, a second device responsive to the temperature at the outlet of said evaporator, circuit means connecting both of said devices in control of said reversible motor, and conduit means connecting said chamber to the outlet of said evaporator.

4. In a refrigerating system including electrically energizable means for operating said system, an expansion valve and an evaporator, a reversible motor for operating said valve, an expansion chamber in close proximity to said valve, restricted fluid passage means connecting said chamber to the upstream side of said valve, a solenoid valve arranged to control flow through said passage means, a device responsive to temperature arranged in said chamber, a similar device responsive to temperature arranged near the outlet of said evaporator, circuit means connecting said devices in control of said motor, and electrical circuit means connecting said solenoid valve to said electrically energizable means for simultaneous operation therewith.

5. A refrigeration control device comprising a chamber member, conduit connections to said member, a metallic cup-like member extending into said chamber, said cup-like member having a retaining flange, a core member shaped to mate with the inner surface of said cup-like member, an impedance winding on the outer mating surface of said core member, means for resiliently holding said core member and winding in firm engagement with said cup-like member, gasket means coacting with said retaining flange and said chamber member, and means including a cap structure engaging said gasket means and retaining said core member and cup-like member in said chamber in a manner to seal said core member and its winding from both fluid in said chamber member and the surrounding atmosphere.

6. Refrigerating control apparatus comprising an expansion valve having a body portion and an upstream inlet for connecting to a source of liquid refrigerant and a downstream outlet for connecting to an evaporator, a motor arranged to actuate said valve, a chamber adjacent said body portion and connected to said upstream side of said valve by a restricted fluid passage, a solenoid valve for controlling said passage, a temperature responsive control element in said chamber, and a fitting in said chamber for connecting a conduit thereto.

7. Refrigerating control apparatus comprising a motor actuated expansion valve including a body portion having an upstream side and a downstream side, a closed chamber adjacent said body portion, a restricted passageway connecting said chamber to the upstream side of said body portion, valve means for controlling said passageway, a conduit connection in said chamber, and temperature responsive impedance means projecting into said chamber, said impedance means comprising a relatively thin cup-like member having a peripheral flange, a core member having an impedance winding on its outer surface and shaped to mate with the inner surface of said cup-like member, spring means for resiliently urging said core member and winding into engagement with said cup-like member and a cap member having electrical terminals therein arranged to seal said cup-like member and core member from the surrounding atmosphere.

8. A refrigerating valve having a body portion, an inlet and an outlet, a valve seat, a reciprocable valve stem, a bellows arranged around said stem and of only sufficient diameter to avoid interference with said stem, a strain release assembly including a spring loaded movable member attached to the lower end of said stem, a valve member attached to the movable member of said strain release assembly and engageable with said seat, an operator for actuating said valve stem, an expansion chamber adjacent said body portion and connected to the inlet of said body portion by a restricted fluid passageway, a solenoid valve arranged to control flow through said passageway, an outlet means for said expansion chamber, and a temperature responsive device extending into said chamber, said device including a generally convex hollow metal shield and a temperature responsive means in engagement with the inner surface of said shield.

9. A refrigerating valve having a body portion, an inlet and an outlet, a valve seat, a reciprocable valve stem, a bellows seal attached to said stem and said body portion and arranged around at least a portion of said stem, said bellows seal having a minimum diameter consistent with operation of said valve stem, a strain release mechanism attached to the lower end of said valve stem, said mechanism including a spring retainer spaced from and encompassing the lower portion of said bellows seal, a cylindrical member attached to said retainer and extending downwardly toward said valve seat, a piston-like disk member slideably mounted within said cylindrical member, lower stop means for limiting the sliding of said disk member, a compression spring between said retainer and said disk member for normally holding said disk member against said lower stop means, and a valve member carried by said disk member for coacting with said valve seat.

10. A refrigerating expansion valve having a hollow body and an inlet and outlet for said body, a valve seat in the lowermost portion of said body and opening directly into said outlet, a valve member for engaging said valve seat, the major portion of said hollow body thus being on the inlet side of said valve seat, a motor for actuating said valve member, an expansion chamber formed integral with said body and having a restricted fluid passageway from the inlet portion of said body to said chamber, an outlet from said expansion chamber, a valve for controling said passageway, and a temperature responsive means arranged within said expansion chamber.

11. A refrigerating expansion valve having a hollow body and a liquid line connection and an evaporator connection, adjustable valve means interposed between said connections, motor means for operating said valve means, an expansion chamber, said expansion chamber being arranged in heat exchange relation with said body on the liquid line side of said valve means, conduit means including a flow restricting passage connecting said chamber with said valve hollow body on the liquid line side of said valve means, a solenoid valve for controlling flow through said conduit means, an outlet passage from said expansion chamber and temperature responsive means arranged within said chamber.

12. A refrigerating control device including a pipe fitting having an opening therein surrounded by an inturned flange, a hollow conical cup-like metal member projecting through said opening and having an outwardly extending flange engaging said inturned flange, a core member shaped to mate with the inner surface of said cup-like member, a temperature responsive means positioned on the outer surface of said core member and engaging the inner surface of said cup-like member, and cap means for retaining said core member in place and for sealing the inside of said cup-like member.

13. A refrigerating control device including a pipe fitting having an opening therein surrounded by an inturned flange, a hollow generally convex cup-like member projecting through said opening and having an outwardly extending flange engaging said inturned flange, a core member shaped to mate with the inner surface of said cup-like member, a temperature responsive means positioned on the outer surface of said core-member and engaging the inner surface of said cup-like member, a cap member, a pin on said member extending into said core member, a compression spring extending between said cap member and said core member, and sealing means arranged between said cap member and said cup-like member for sealing the inside of said cup-like member.

WILLIAM L. HUNTINGTON.

REFERENCES CITED

The following references are of record in the file of this patent:

UNITED STATES PATENTS

| Number | Name | Date |
| --- | --- | --- |
| 1,913,298 | Wiegand | June 6, 1933 |
| 2,102,030 | Quereau | Dec. 14, 1937 |
| 2,138,796 | Sparrow | Nov. 29, 1938 |
| 2,146,681 | Kronmiller | Feb. 7, 1939 |
| 2,367,524 | Ray | Jan. 16, 1945 |
| 2,449,437 | Winchester | Sept. 14, 1948 |
| 2,453,584 | Newton | Nov. 9, 1948 |
| 2,465,981 | Robertson | Mar. 29, 1949 |
| 2,480,166 | Schwartzwalder et al. | Aug. 30, 1949 |